United States Patent [19]
Thurm

[11] Patent Number: 5,884,380
[45] Date of Patent: Mar. 23, 1999

[54] METHOD OF ATTACHING A MOTORCYCLE GAS TANK COVER

[76] Inventor: Kenneth R. Thurm, 2348 Rockridge Cir., Orange, Calif. 92667

[21] Appl. No.: 551,891

[22] Filed: Oct. 23, 1995

(Under 37 CFR 1.47)

[51] Int. Cl.⁶ .............................. B62K 11/00; B65D 65/02
[52] U.S. Cl. ........................ 29/401.1; 150/167; 180/219; 29/428
[58] Field of Search ................................. 29/401.1, 428; 180/219; 150/167; D12/114, 402

[56] References Cited

U.S. PATENT DOCUMENTS

| | | |
|---|---|---|
| D. 170,077 | 7/1953 | Brown . |
| D. 177,276 | 3/1956 | Pichette . |
| D. 177,915 | 6/1956 | Kalt . |
| D. 245,838 | 9/1977 | Messinger . |
| D. 245,903 | 9/1977 | Harris, Jr. . |
| D. 252,328 | 7/1979 | Moore, Sr. . |
| D. 262,957 | 2/1982 | Harmer . |
| D. 264,704 | 6/1982 | Rehberg . |
| D. 281,770 | 12/1985 | Stahel et al. ............................ D12/126 |
| D. 300,418 | 3/1989 | Yamada et al. . |
| D. 313,207 | 12/1990 | Yamada et al. ......................... D12/126 |
| 4,469,256 | 9/1984 | McEwen .................................. 224/439 |
| 4,813,511 | 3/1989 | Yamaguchi et al. ..................... 180/219 |
| 5,490,549 | 2/1996 | Biette ...................................... 296/78.1 |

OTHER PUBLICATIONS

*Austro–Motor*, Apr. 1977, p. 177.
*Drag Specialties Leads You*, Drag Specialties, finer accessories for all motorcycles.

*Accessories Pour Velosolex*, S 3300.

*Drag Specialties Catalog*, 1995, p. 399, the chrome horn cover, gas tank with flame design, gas tanks (Fat Boy Style) and aluminum lower dash panels.

*Drag Specialties Catalog*, 1995, pp. 313, 421, 422 and 436, the chrome horn cover, gas tank with flame design gas tanks (Fat Boy Style) and aluminum lower dash panels.

One page from Hot Bike Magazine, Jul. 1995 (Tess).

One page from Hot Bike Magazine, Jul. 1995 (Down 'N Out There).

One page from Hot Bike Magazine, Jul. 1995 (Mint Heritage).

Supercycle Magazine, Aug., 1995, p. 11.

*Primary Examiner*—P. W. Echols
*Attorney, Agent, or Firm*—Knobbe, Martens, Olson & Bear, LLP

[57] ABSTRACT

A motorcycle gas tank cover comprising a sheet of material shaped to cover a stock gas tank to modify the appearance of the size and shape of the tank. The gas tank cover is attachable to the gas tank by connectors and fasteners which secure the gas tank in place. The appearance of the gas tank is modified without removing or replacing the gas tank. The present invention provides a method and apparatus to frequently modify the appearance of motorcycle gas tank and the total look of the motorcycle that does not require replacing any motorcycle parts.

9 Claims, 6 Drawing Sheets

METHOD OF ATTACHING A MOTORCYCLE GAS TANK COVER

CROSS-REFERENCE TO RELATED APPLICATIONS

A design patent application entitled Motorcycle Gas Tank Cover was filed concurrently herewith, naming Kenneth R. Thurm as the inventor and having attorney docket number KENDO.006DA. This design patent application is hereby incorporated by reference herein.

FIELD OF THE INVENTION

The present invention relates to motorcycle gas tanks and, in particular, to a method and apparatus for altering the appearance of a motorcycle gas tank.

BACKGROUND OF THE INVENTION

Many motorcycle owners enjoy "fixing up" their bikes to change the look of their motorcycle. This is especially popular among Harley-Davidson motorcycle owners, although many other motorcycle owners engage in such fix-up efforts. Owners frequently fix up their motorcycles solely for aesthetic purposes. Although a motorcycle owner may purchase a smooth-running, fully-functional vehicle, many owners prefer to personalize their motorcycle to their own taste or personality by altering the look of the motorcycle. Motorcycle owners will frequently spend considerable time and money on such pursuits even though the motorcycle is new.

Many of the motorcycle owners who fix up their motorcycles enjoy constantly upgrading or modifying their look. New trends in the market and competition between motorcycle owners require the owner to frequently change the look of the motorcycle. Thus, thousands of dollars are often spent by a motorcycle owner in fixing up or accessorizing his or her motorcycle.

A current trend among motorcycle owners is to alter the shape of the stock gas tank. A Harley-Davidson motorcycle comprises a stock gas "tank" with either a 4.2 gallon or 5.0 gallon fuel capacity, depending on which size of tank is installed on the motorcycle. The tank is broken up into two separate containers and mounted on either side of the frame of the motorcycle. The combined fuel capacity of both containers of a tank equals either 4.2 or 5.0 gallons. Although each container of the gas tank has an intake orifice and gas cap for receiving fuel into the tank, the two containers are joined by a transfer tube which maintains an equal level of fuel in each container.

Many motorcycle owners desire to modify the shape of the stock gas tanks on Harley-Davidson motorcycles. There is an approximately three to four inch gap between the rear of the gas tank and the front edge of the seat on a Harley-Davidson motorcycle. For purely aesthetic reasons, owners desire to modify the appearance of the size and shape of the gas tank to cover this gap. Some owners also desire to create the appearance of a larger gas tank, without actually incurring the expense of increasing the tank's fuel capacity.

Currently, many Harley-Davidson motorcycle owners spend hundreds of dollars each to purchase an after-market gas tank designed to eliminate the gap that exists between the stock tank and the seat. This is accomplished currently by welding an extension piece to the rear of each of the Harley-Davidson gas tanks or by welding an extension onto a standard Harley-Davidson after-market gas tank. The modified gas tank thus looks like a larger gas tank, yet the extension piece does not increase or otherwise modify the fuel capacity of the stock tank in any way.

A modified after-market gas tank of this type usually sells for approximately $750. Further, the welding charges for modifying a standard gas tank are very high due to the fact that the gas tank has usually already been filled with gas. To install the after-market gas tank or to modify the stock tank, the stock tank must be removed from the motorcycle. The new tank is then installed in the same location as the stock tank. In the case of the after-market gas tank, upon installation the motorcycle owner has no use for the removed stock gas tank.

Because motorcycle gas tanks on motorcycles are exposed, dents or scratches in the paint are visible. In order to maintain a new appearance or certain look of the motorcycle, each time the gas tank is dented, it must be repaired or in some cases even replaced. To replace a stock Harley-Davidson motorcycle gas tank costs approximately $350–750, not including the paint job. Further repair of a dent or paint chip can involve significant time in the body shop during which time the motorcycle cannot be used by the owner. Hence, when a motorcycle gas tank is damaged, the owner can easily spend hundreds of dollars to replace it, often resulting in some possibly lengthy downtime for the motorcycle. If the tank is damaged frequently, the replacement cost multiplies. Additionally, motorcycle owners in remote areas may find it particularly costly and difficult to find a motorcycle shop which fixes or replaces Harley-Davidson motorcycle gas tanks.

SUMMARY OF THE INVENTION

The present invention recognizes the need for a less expensive alternative to removing and replacing the gas tank on a motorcycle to modify the appearance of the tank. The present invention alters the appearance and overall look of the gas tank at relatively low cost. Since the gas tank is not removed, a motorcycle owner can change the look of his or her motorcycle without great expense or professional service.

The present invention provides a motorcycle gas tank cover made of a material that retains its shape and fits over a stock motorcycle gas tank. In one preferred embodiment, the gas tank cover is for a Harley-Davidson motorcycle and the gas tank cover extends to meet the motorcycle seat, thereby eliminating the gap between the seat and the gas tank.

Although in a preferred embodiment the gas tank cover is similar in shape to a stock gas tank, it advantageously differs in size and overall shape. For the Harley-Davidson gas tank cover, the shape of the gas tank cover is preferably similar to the after-market gas tank for Harley-Davidson motorcycles of the type that have an extension piece welded to a stock tank. Advantageously, because it is shaped like an after-market gas tank, the tank cover of the present invention may be used to cover either a stock tank or an after-market gas tank. When the gas tank cover for the Harley-Davidson is installed over a stock gas tank, the tank looks larger and the gap between the tank and seat is eliminated.

An embodiment made in accordance with the present invention is attachable to an existing gas tank by flanges connected to the gas tank cover in the same locations as the nuts and bolts for securing the stock motorcycle gas tank to the motorcycle. In the case of the Harley-Davidson embodiment of the invention, one method for installing the gas tank cover comprises removing at least some of the nuts and bolts which secure the stock gas tank to the motorcycle. The tank cover is fitted around the gas tank and the removed bolts inserted through the flanges of the present invention and secured with the nuts. The gas tank cover is thus fastened to the gas tank.

One advantage of the present invention is that motorcycle owners can change the look of their motorcycle at relatively low cost. An owner can change the look of the gas tank as often as is desired without incurring enormous expense.

Furthermore, the gas tank cover can be provided in sets of different covers for various parts of a motorcycle to modify the total look of the vehicle. While a standard good quality paint job for a Harley-Davidson motorcycle currently costs approximately $3000, the present invention provides a set of removable covers which can be used to change the overall look of the motorcycle. The owner may select a set of covers corresponding to a single theme or combine the various covers for a unique look. The sets of covers might include covers for the gas tank, the dashboard, the oil tank, the horn, the air filter, or any combination thereof. Raised portions on the covers for the various motorcycle parts may correspond to such indicia as a flame, lightning bolts or a "ball mill" look. Thus, the total look of the motorcycle can be changed without removing or replacing any parts.

Another advantage of the present invention is that it enables a motorcycle owner to modify the look of the motorcycle without professional service. Therefore, the present invention makes it feasible and less costly for an owner in a remote area to fix-up his or her motorcycle.

Although the preferred embodiment of the motorcycle gas tank cover is described in relation to Harley-Davidson motorcycles and Harley-Davidson gas tanks, the gas tank cover made in accordance with the present invention may be used to cover any motorcycle gas tank.

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of accompanying drawings.

BRIEF DESCRIPTION OF THE DRAWINGS

FIG. 5a is a cross-section view along line 5a—5a of the gas tank cover shown in FIG. 4.

FIG. 5b is a cross-section view of another embodiment of the motorcycle gas tank cover shown in FIG. 5a.

DETAILED DESCRIPTION OF THE PREFERRED EMBODIMENTS

Figure 1:
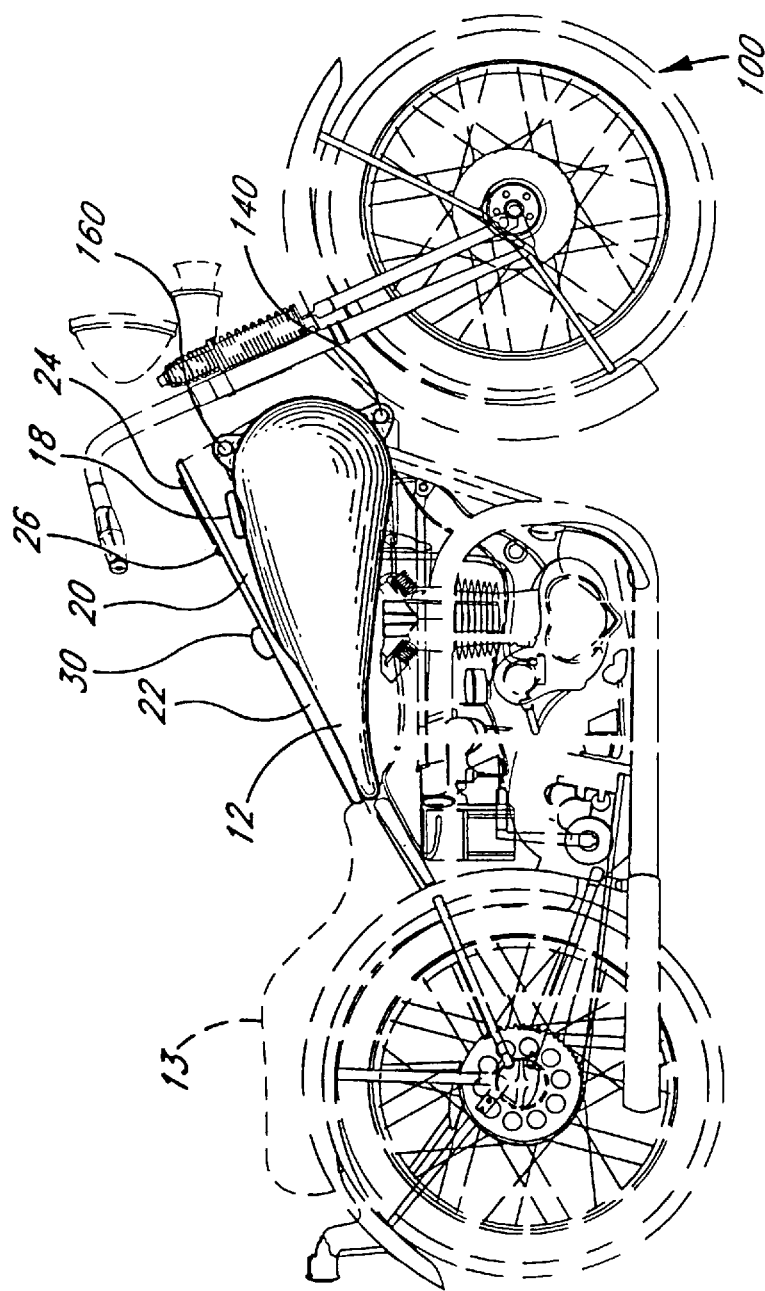
FIG. 1 is a right side view of one embodiment of a motorcycle gas tank cover made in accordance with the present invention as mounted on a motorcycle.

Referring to FIG. 1, a preferred embodiment of a right motorcycle gas tank cover 12 made in accordance with the present invention is removably fastened to a gas tank located on the side of a motorcycle 100. The motorcycle gas tank cover 12 comprises a sheet of material that retains its shape and is formed generally in the shape of a gas tank, two flanges 140 and 160 formed as part of the sheet of material, an opening in the cover for the gas cap, and a dashboard cover 22 preferably used to fasten the gas tank cover 12 to the motorcycle 100.

In a preferred embodiment, the motorcycle gas tank cover 12 is shaped to fit over either a Harley-Davidson 4.2 or 5.0 gallon tank. The exterior shape of the gas tank cover made for covering the 4.2 gallon is advantageously the same as that for covering the 5.0 gallon gas tank.

While the shape of the gas tank cover 12 is similar to the shape of the Harley-Davidson gas tank, it is not necessarily identical in size. The gas tank cover 12 extends to meet the front edge of the motorcycle seat 13, thereby eliminating the approximately 3–4 inch gap that exists between a stock gas tank 32 and the seat 13 of a Harley-Davidson gas tank.

In addition, the gas tank cover 12 may be formed in the same size and shape to cover any motorcycle gas tank. Any motorcycle gas tank can be used as a model for a mold for forming the sheet of material into a gas tank cover. Advantageously a process called vacuum molding is used for quality and cost efficiency to make the motorcycle gas tank. In vacuum molding, the pressure on the exterior and interior surfaces of the gas tank cover are controlled. This method is advantageous because in creating the gas tank cover, it is important to shape both sides of the sheet of material for a smooth finished product. Although injection molding will also create controlled pressure on the surfaces, it is much more costly to practice than vacuum molding.

In the Harley-Davidson embodiment, a Harley-Davidson stock gas tank or an after-market gas tank is used as a model to form a positive mold, or male mold, for the vacuum molding process. A sheet of material, preferably an ⅛ inch thick sheet of plastic ABS d.o.t. 184, is then vacuum molded.

Because the motorcycle gas tank cover may be shaped to fit any motorcycle gas tank, it is not necessarily the case that the gas tank cover will substantially alter the look of the motorcycle. In some cases the gas tank cover may be shaped exactly the same as the gas tank. In this instance, the gas tank cover may provide the gas tank with a protective paintable cover and a new look, but will not change the shape of the tank. In other circumstances, such as in the Harley-Davidson embodiment, the gas tank may alter the shape and the look of the gas tank, as well as provide the tank with a protective cover. A protective paintable cover for the any motorcycle gas tank is advantageous to minimize and conceal damage to the tank.

One object of the present invention is to provide a gas tank cover 12 with an exterior surface to which high gloss paint will adhere. The exterior surface must be capable of holding high gloss vehicle paint of the type commonly used on motorcycle gas tanks. This permits the motorcycle owner to paint the tank cover different colors or with different designs to further modify the look of the motorcycle.

Figure 2:
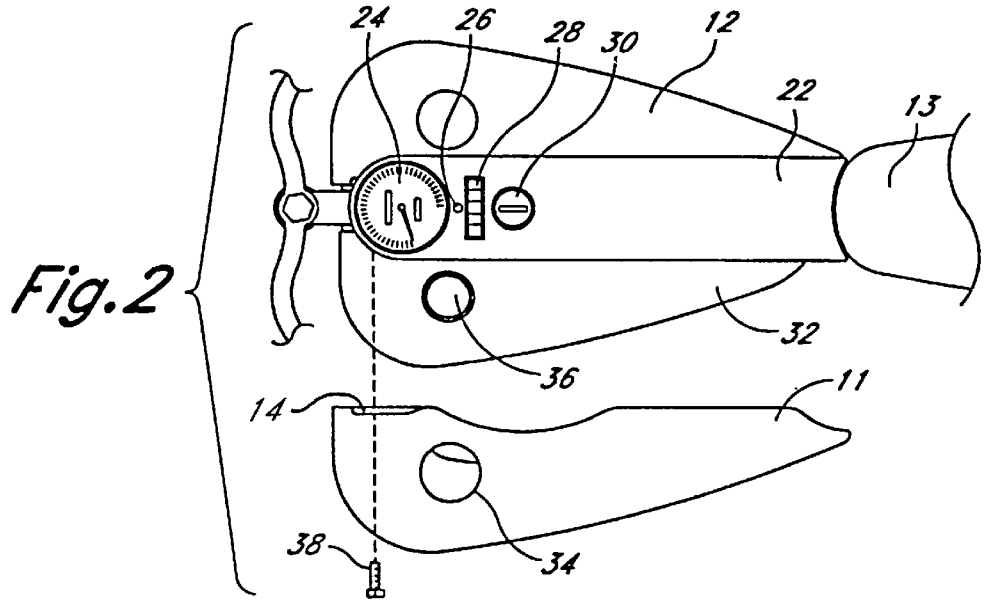
FIG. 2 is an exploded top view of the embodiment shown in FIG. 1.
Figure 3:
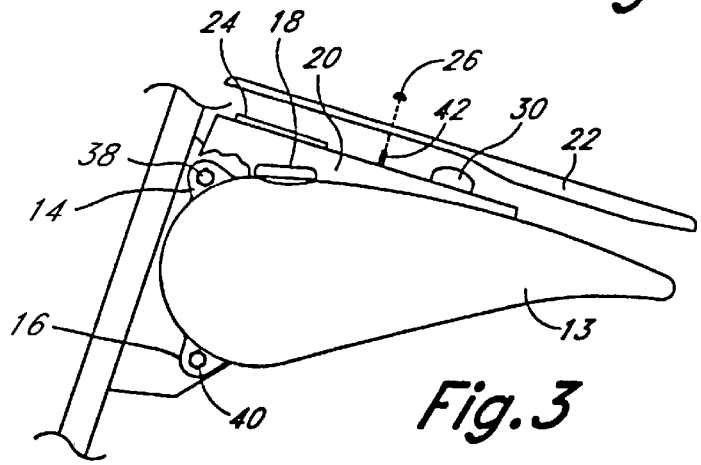
FIG. 3 is a left side view of the embodiment shown in FIG. 1 with an exploded view showing one embodiment of a dashboard cover made in accordance with the present invention.
Figure 4:
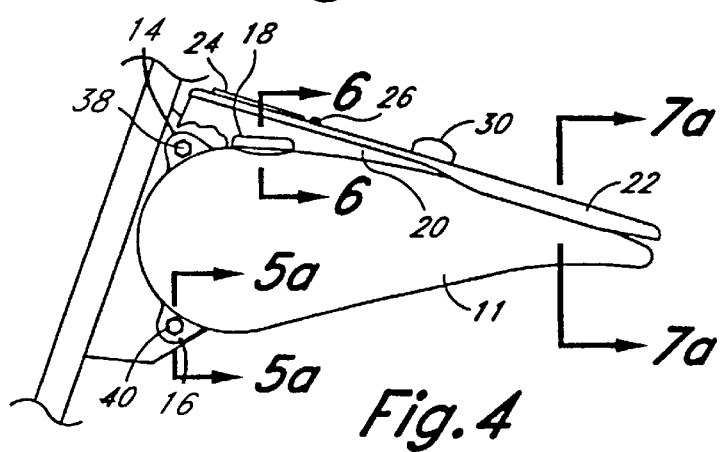
FIG. 4 is a left side view of the embodiment shown in FIG. 1 made in accordance with the present invention.

Referring to FIGS. 2–4, in a preferred embodiment of the present invention, the gas tank cover 11 is fastened to the gas tank 32 by bolts 38 and 40 that hold the gas tank 32 in place. A predetermined number of flanges 14 and 16 fasten the gas tank cover 11 to the gas tank 32. In a preferred embodiment, two flanges 14 and 16 are connected to the motorcycle gas tank cover 11 near the front edge of the tank 32. The flanges 14 and 16 are located in the same place as the hexhead bolts 38 and 40 which fasten the stock gas tank 32 to the motorcycle 100.

The number of flanges connected to the gas tank cover 11 is determined by the number of connectors holding the existing gas tank 32 in place. While at least some connector locations of the existing gas tank are used, it is not necessary for the tank cover to be attached with the same number connectors.

To fasten the gas tank cover 11 to the gas tank 32, the tank connectors 38 and 40, usually comprising nuts and bolts, are temporarily removed from the gas tank 32. The gas tank cover 11 is then positioned to cover the gas tank 32. Finally, the nuts and bolts 38 and 40 are replaced and tightened over both the gas tank 32 and the tank cover 11 to secure the gas tank cover 11 in place. Following the same procedure, a second gas tank cover 12 is attached to the other side of the motorcycle 100 over the other gas tank.

Figure 2A:
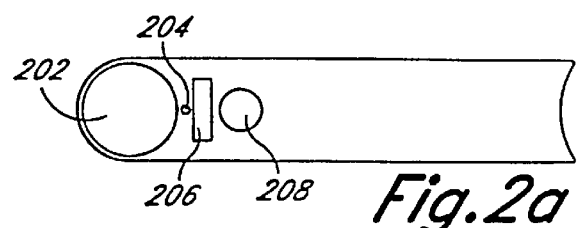
FIG. 2a is a top view of a dashboard cover made in accordance with the present invention.

The dashboard cover 22 further secures the gas tank cover 11 to the gas tank 32. Referring to FIG. 2a, the dashboard cover 22 of the present invention comprises the sheet of material formed to cover the dashboard 20 of a Harley-Davidson motorcycle with a speedometer opening 202, a bolt opening 204, a light panel opening 206, and an ignition opening 208 in the appropriate locations for the speedometer 24, the dashboard fastener 26, the hazard light panel 28, and the ignition 30.

Similar to the gap which exists between a stock gas tank and the seat of a stock Harley-Davidson motorcycle, an approximately two to three inch gap exists between the dashboard 20 of the Harley-Davidson motorcycle and its seat 13. The dashboard cover 22 of the present invention extends to meet the front edge of the motorcycle seat 13, thereby eliminating this gap. In addition, the rear edge of the dashboard cover 22, where the dashboard cover meets the seat 13, is curved to complement the front curve of the seat 13. Therefore, dashboard cover 22 of the present invention eliminates the gap between the dashboard 20 and the seat 13.

The dashboard 20 of a Harley-Davidson motorcycle includes a single nut 26 and bolt 42. This is used to secure the dashboard cover 22 to the dashboard. A bolt opening 204 is located on the dashboard cover where the nut and bolt 42 of the dashboard are located. To install the dashboard cover 22, the nut 40 adjacent the speedometer 24 is temporarily removed so that the dashboard cover 22 can be positioned over the dashboard 20. The nut 40 is then replaced and tightened to secure the dashboard cover 22 in place.

Figures 5A, 5B:
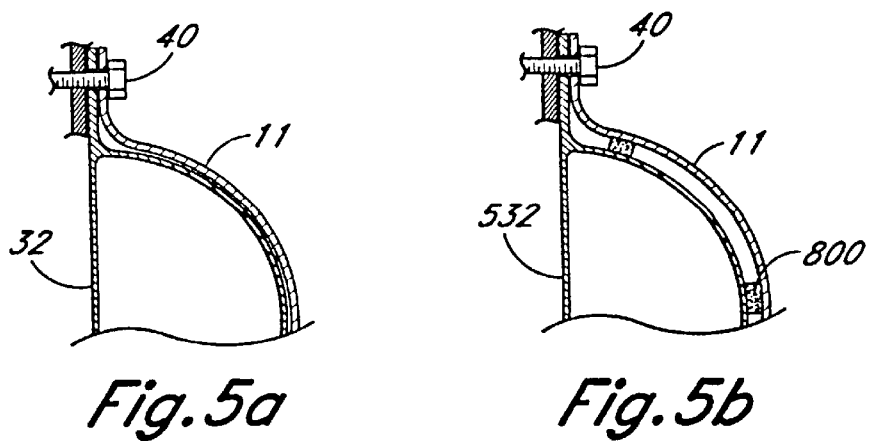

Referring to FIG. 5a, the bolt 40 which connects the gas tank 32 to the motorcycle 100 is long enough to be inserted through the connectors on the gas tank cover 11 to secure it to the motorcycle. In FIG. 5b, a further embodiment of the motorcycle gas tank cover made in accordance with the present invention is shown. To protect the gas tank 532 from scratches or damage ribbing 800 may be attached to the gas tank cover 11. Advantageously, when a gas tank cover made in accordance with a preferred embodiment is positioned over a 4.2 Harley-Davidson stock tank, the ribbing 800 prevents the gas tank cover from denting or dimpling.

Figure 6:
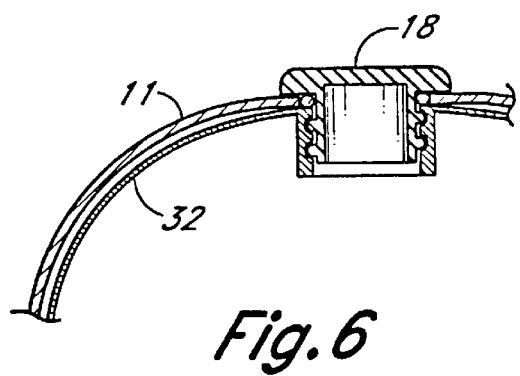
FIG. 6 is a cross-section view along line 6—6 of the embodiment shown in FIG. 4.

The gas tank cover 11 is additionally secured to the gas tank 32 by the frictional force exerted upon the gas tank cover 11 by the gas cap 18, as shown in FIG. 6. The gas tank cover 11 has an opening 34 in the same location as the gas tank's intake orifice 36 for fuel. The gas cap 18 screws onto the tank 32 over the opening 34, thereby exerting pressure on the gas tank cover 11. The pressure depresses the gas tank cover 11 toward the gas tank 32. This force further secures the gas tank cover 11 in place.

Figure 7A:
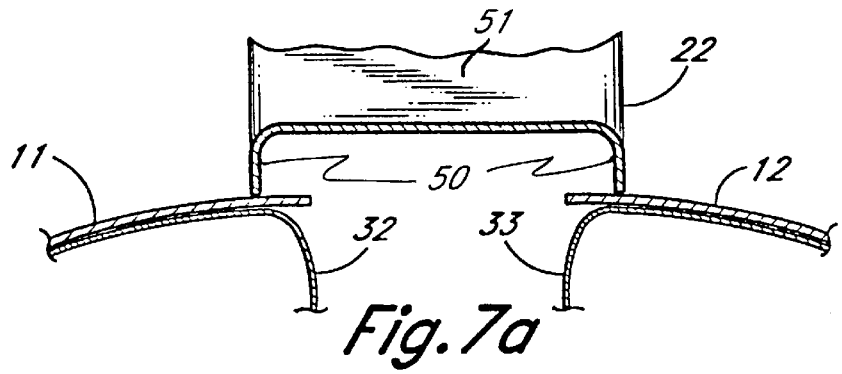
FIG. 7a is a cross-section view along line 7a—7a of the embodiment of the motorcycle gas tank cover shown in FIG. 4.

Referring to FIG. 7a, it can be seen that the dashboard 22 has an upper planar surface 51 and two downwardly depending feet 50 that extend toward the gas tank covers 11 and 12. The downwardly depending feet 50 of the dashboard cover 22 are located on both sides of the main panel 51. Once secured, the feet 50 of the dashboard cover 22 are in frictional contact with the gas tank covers 11 and 12 attached over both the right and left side gas tanks of the motorcycle 100. The pressure exerted by the dashboard cover 22 onto the gas tank covers 11 and 12 additionally keeps the gas tank covers 11 and 12 in place.

Figure 7B:
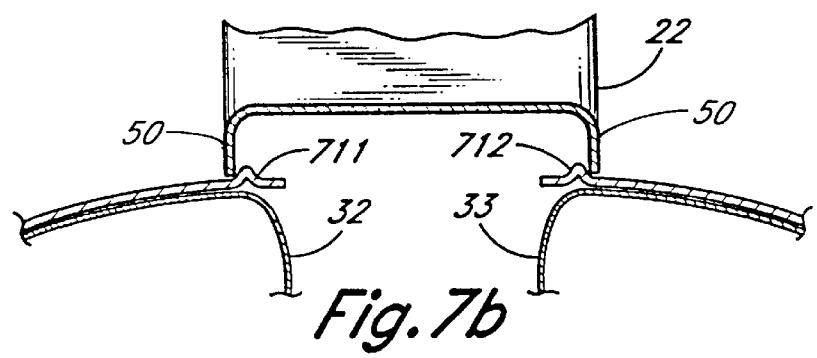
FIG. 7b shows an alternate embodiment of the motorcycle gas tank cover wherein the difference is an alternate cover retaining feature, for evaluation this is shown as a cross-section view along line 7a—7a of the motorcycle gas tank cover shown in FIG. 4.

In an alternative embodiment, as shown in FIG. 7b, the edge of the gas tank cover 12 may contain a raised elongated bump 711 and 712 in the sheet of material. This bump preferably extends about four to five inches or approximately the length of the feet 50 of the main panel 51 of the dashboard cover. When the dashboard cover 22 is secured, the raised elongated bumps 711 and 712 of the gas tank covers 11 and 12 are positioned on the inner side of the feet 50 of the dashboard cover. The mating contact between the bumps 711 and 712 on the gas tank covers 11 and 12 and the feet 50 of the dashboard cover 22 reinforces the attachment of the gas tank covers 11 and 12 to the gas tanks.

Figure 8:
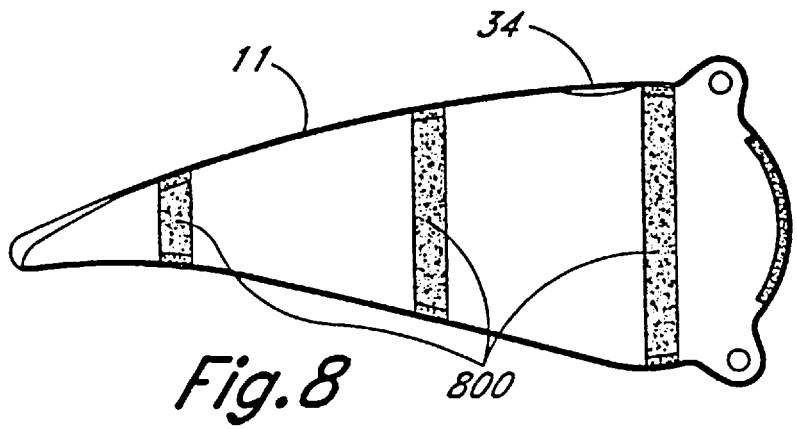
FIG. 8 is an interior view of a motorcycle gas tank cover of the embodiment shown in FIG. 5b.

Although the exterior shape of the gas tank cover for the different sizes of gas tanks are identical, there are two differences between the cover for the 4.2 gallon tank and the 5.0 gallon tank. First, as illustrated in FIG. 8, the motorcycle gas tank cover 11 for the 4.2 gallon tank comprises ribbing 800 adhered to its interior surface to prevent a tin can effect. Because the 4.2 gallon tank is slightly smaller than the 5.0 gallon tank there exists a slight gap between the gas tank 32 and the tank cover 11 once attached. Therefore, there is a risk that the tank cover 11 might dimple or dent when pressure is applied. To prevent this, the interior surface of the tank cover is lined with ribbing 800 which forms a soft cushion between the gas tank 32 and the tank cover 11.

In a preferred embodiment, the ribbing 800 comprises single-sided adhesive foam strips approximately 1/16 to 3/8 inch in thickness. In a further embodiment of the present invention, the interior of the gas tank cover for either the 4.2 gallon or the 5.0 gallon tank may be lined with any type of non-abrasive material, such as felt, to create a buffer between the cover and the tank. The lining reduces the risk of the motorcycle gas tank cover scratching the paint on the stock gas tank.

The second difference between the 4.2 gallon and the 5.0 gallon tank is the location of the opening 34 for the gas cap 18. Due to the slight difference in fuel capacity of the gas tanks, the existing intake orifice 36 for the gas tank 32 and its gas cap 18 are located in different locations on the 4.2 gallon tank and the 5.0 gallon tank. The gas cap of the 4.2 gallon tank is approximately one half inch closer to the dashboard than the gas cap on the 5.0 gallon tank.

Figure 9:
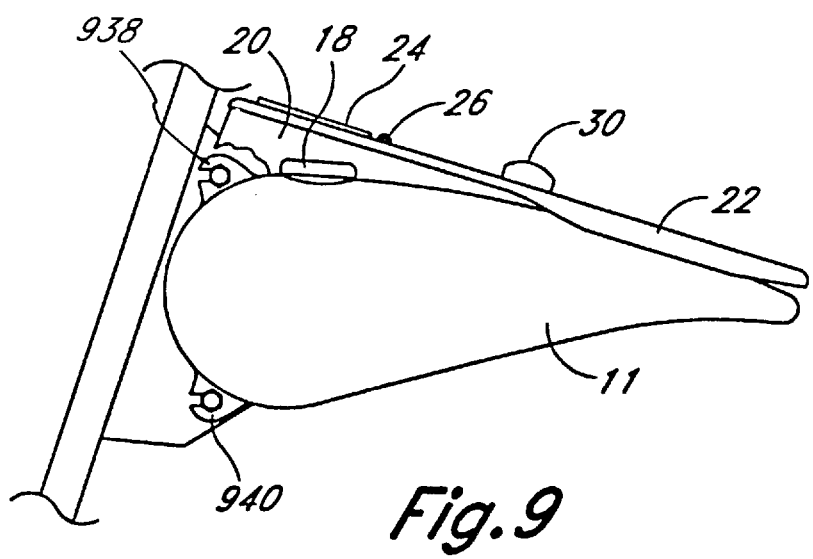
FIG. 9 is a side view of another preferred embodiment of a motorcycle gas tank cover made in accordance with the present invention.

In a further preferred embodiment, as illustrated in FIG. 9, horseshoe-shaped connectors 938 and 940 fasten the gas tank cover 11 to the gas tank 32. Similar to the flanges 14 and 16 of the preferred embodiment, the horseshoe-shaped connectors 938 and 940 are located in the same place as the nuts and bolts 38 and 40 which fasten the stock gas tank 32 to the motorcycle 100. The horseshoe-shaped connectors 938 and 940, however, slide around the loosened bolt. One advantage of this embodiment is that the connectors 38 and 40 which hold the gas tank 32 in place need not be completely removed to secure the gas tank cover 11 to the gas tank 32.

Figure 10:
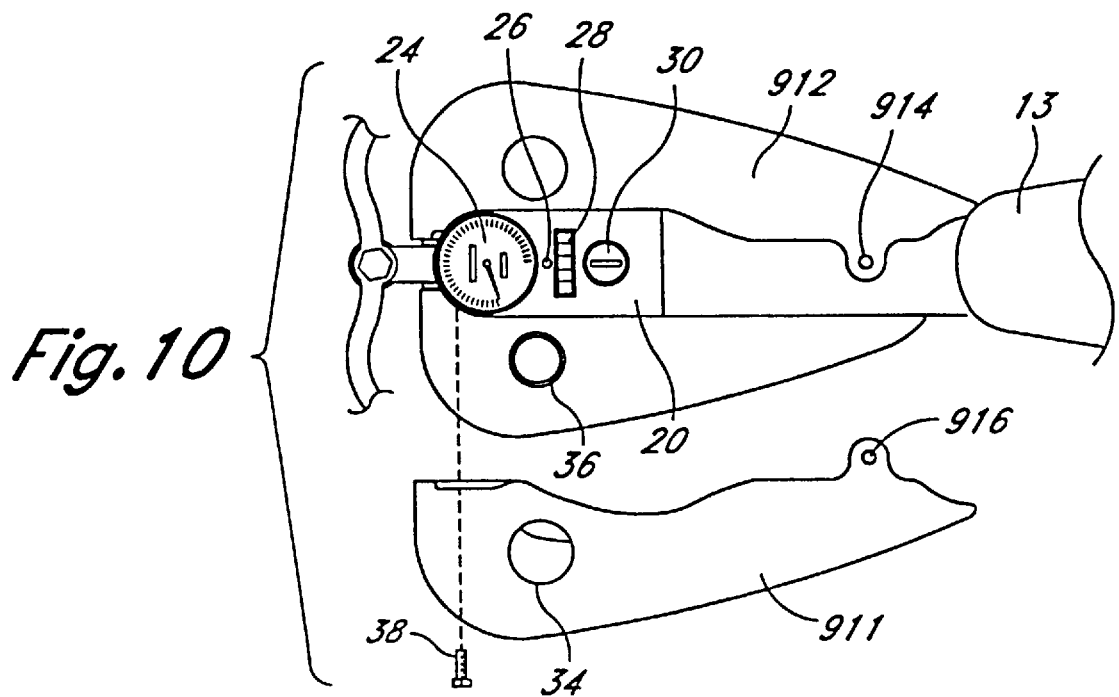
FIG. 10 is a top plan exploded view of a further embodiment of the motorcycle gas tank cover made in accordance with the present invention.
Figure 10A:
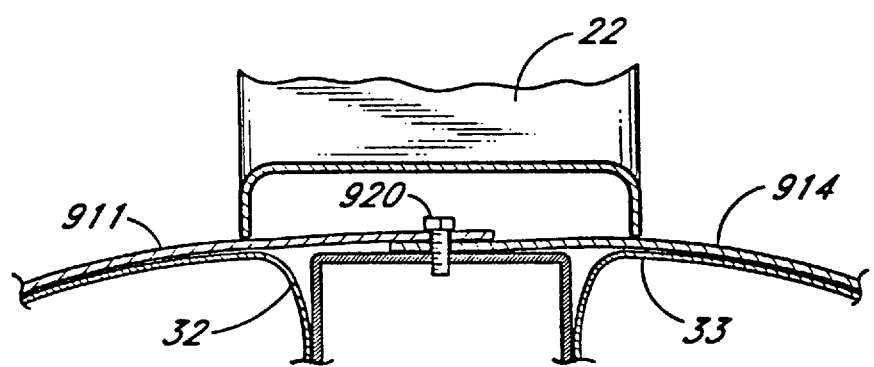
FIG. 10a is a cross-section view of the embodiment shown in FIG. 10, showing the connection of the embodiment of FIG. 10 in an assembled view.

As shown in FIGS. 10 and 10a, in further embodiments made in accordance with the present invention, the gas tank covers 911 and 912 may be additionally secured to the motorcycle 100 by a connector 920 in the location of an existing bolt on the dashboard 22. In this embodiment, the motorcycle gas tank cover comprises a flange made from the same sheet of material as used to form the gas tank cover. The flange 916 is located on the top portion of the gas tank cover and is parallel to the dashboard. When installed, the flanges 914 and 916 of both gas tank covers 911 and 912 overlap and are connected to each other by a bolt 920. Preferably, this bolt 920 is hidden underneath the dashboard cover 22, however, this is not necessarily the case.

Figure 11:
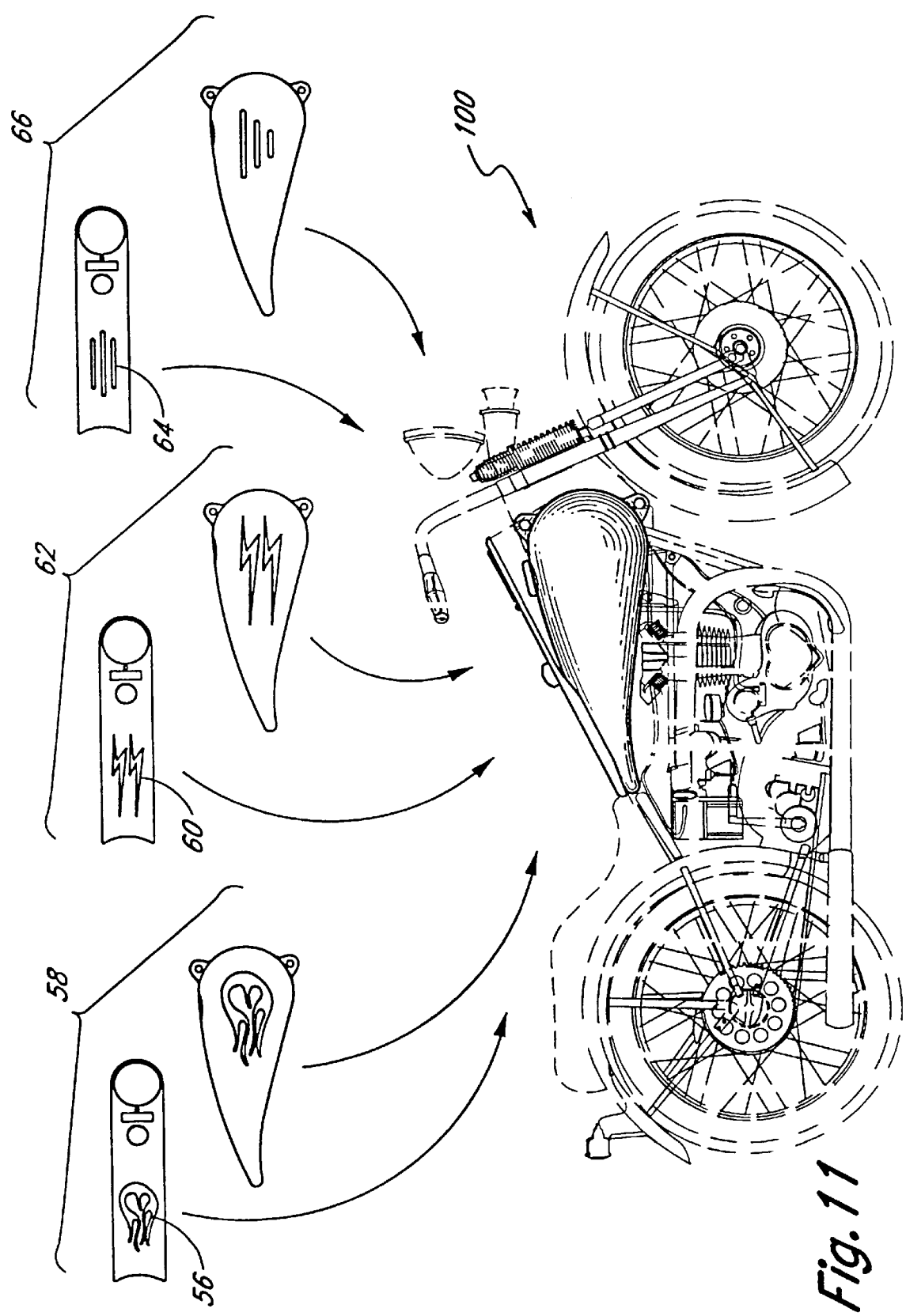
FIG. 11 illustrates the interchangeability of sets of different covers for parts of a motorcycle.

In a further embodiment of the present invention, the gas tank cover 11 comprises a sheet of material formed with raised portions for indicia. Referring to FIG. 11, raised designs for the gas tank cover 12 might include a flame 56, lightning bolts 60, or a "ball-mill" look 64. The ball-mill look is a likeness of a pattern that the ball-mill of a tool can create. Sets of different covers 58, 62, and 66, which may include covers for the gas tank, the dashboard, the air filter, the oil tank and the horn, or any combination thereof, may be fastened to a motorcycle 100 to modify its appearance. In still further embodiments of the present invention, the raised indicia of the covers are chrome plated or made of carbon fiber to create a multitude of different looks.

By selecting a set of covers corresponding to a single theme, a motorcycle owner may quickly and easily change the look of his motorcycle. A motorcycle owner may desire to modify the look of his motorcycle, depending on the styles of the other riders in a group that ride together. The present invention allows the owner the flexibility to alter the look of his motorcycle frequently without incurring outrageous expense. Additionally, because the motorcycle owner can modify the look of the motorcycle on his own, modifying the look of the motorcycle is quick and relatively simple.

It is understood that the present invention may be applied to any motorcycle gas tank cover. In other motorcycles, often a single gas tank wraps around the motorcycle. The motorcycle gas tank cover made in accordance with the present invention may be adapted to cover this type of gas tank, preferably utilizing some or all of the existing connectors used to secure the gas tank to the motorcycle.

What is claimed is:

1. A method of modifying the appearance of the shape of an existing gas tank of a motorcycle comprising the steps of:

providing a motorcycle gas tank cover having at least one flange adapted for use with at least one of the fasteners which secures the existing gas tank to the motorcycle, wherein the exterior shape of said motorcycle gas tank cover looks like the exterior of a real gas tank having a different shape than the shape of the existing gas tank that is being covered;

placing said motorcycle gas tank cover over said existing gas tank such that the gas tank cover appears to be the gas tank for the motorcycle; and fastening said motorcycle gas tank cover to said existing gas tank using at least one of the fasteners which secures said existing gas tank to the motorcycle.

2. The method of claim 1, wherein fastening said motorcycle gas tank cover to said existing gas tank further includes using all of the fasteners which secure said existing gas tank to the motorcycle.

3. The method of claim 1, wherein fastening said motorcycle gas tank cover to said gas tank further includes using at least one fastener which is not used for securing said existing gas tank to the motorcycle.

4. The method of claim 3 additionally comprising placing a dashboard cover over at least a portion of a dashboard of the motorcycle and over a portion of the gas tank cover.

5. The method of claim 1, wherein placing said motorcycle gas tank cover over said existing gas tank is performed while said existing gas tank is on the motorcycle.

6. A method of modifying the appearance of a motorcycle gas tank comprising:

placing a motorcycle gas tank cover over said gas tank such that the gas tank cannot be seen by one viewing the motorcycle, the motorcycle gas tank cover having an external surface, at least a portion of the external surface of the gas tank cover being visible to a viewer of the motorcycle when said gas tank cover is installed on the motorcycle, the entire external surface which is visible to the viewer having a shape similar to, but not identical to, the shape of said gas tank; and fastening said motorcycle gas tank cover to said gas tank while said gas tank is on the motorcycle, wherein fastening said motorcycle gas tank cover to said gas tank further involves removing at least one of the fasteners which secures the gas tank to the motorcycle before said motorcycle gas tank cover is placed over said gas tank and replacing at least one of the fasteners to the motorcycle after said motorcycle gas tank cover is placed over said gas tank.

7. A method of modifying the appearance of the shape of a gas tank of a motorcycle comprising:

providing a motorcycle gas tank cover having at least two tabs, each tab adapted for use with a fastener which secures a gas tank to the motorcycle, wherein the externally visible surface of the gas tank cover looks like a motorcycle gas tank yet has a different shape than the shape of said gas tank;

removing at least two of the fasteners which secure said gas tank to the motorcycle;

placing the motorcycle gas tank cover over said gas tank;

positioning each tab of the motorcycle gas tank cover over one of at least some of the locations on the motorcycle from which the gas tank fasteners were removed; and fastening the motorcycle gas tank cover to said gas tank.

8. The method of claim 7, wherein fastening the motorcycle gas tank cover to the gas tank involves replacing the gas tank fasteners to the motorcycle.

9. The method of claim 7, wherein fastening the motorcycle gas tank cover to said gas tank further includes removing the gas tank cap from the motorcycle before the gas tank cover is placed over said gas tank and replacing the gas tank cap to the motorcycle after the gas tank cover is placed over said gas tank.

* * * * *